(No Model.)
H. FRANC, Jr.
ATTACHMENT FOR EYEGLASSES OR SPECTACLES.
No. 533,987. Patented Feb. 12, 1895.
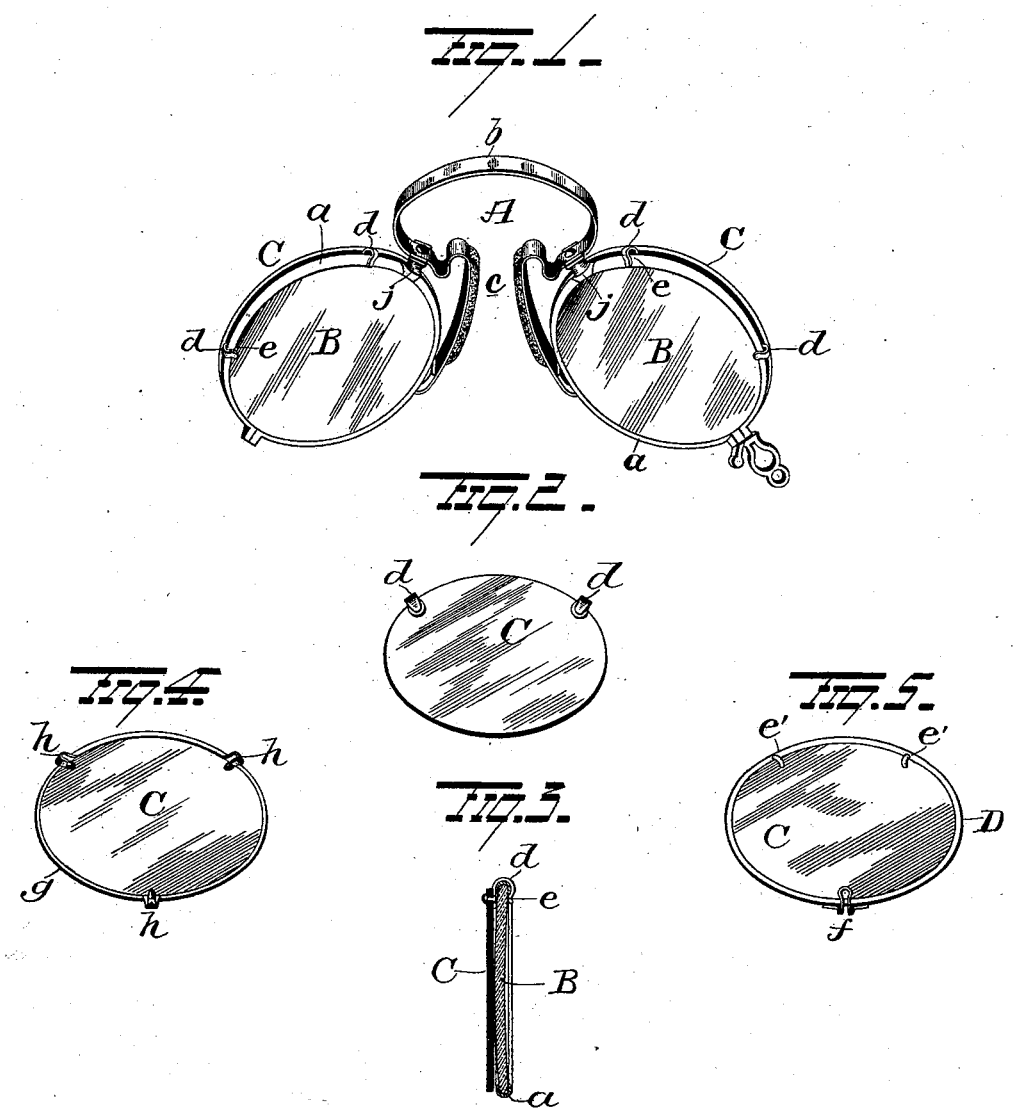
Witnesses
G. F. Downing
E. J. Nottingham
Inventor
H. Franc Jr
By H. A. Seymour
Attorney

UNITED STATES PATENT OFFICE.

HENRY FRANC, JR., OF WASHINGTON, DISTRICT OF COLUMBIA.

ATTACHMENT FOR EYEGLASSES OR SPECTACLES.

SPECIFICATION forming part of Letters Patent No. 533,987, dated February 12, 1895.

Application filed June 18, 1894. Serial No. 514,951. (No model.)

*To all whom it may concern:*

Be it known that I, HENRY FRANC, Jr., of Washington, in the District of Columbia, have invented certain new and useful Improvements in Attachments for Eyeglasses or Spectacles; and I do hereby declare the following to be a full, clear, and exact description of the invention, such as will enable others skilled in the art to which it appertains to make and use the same.

My invention relates to an improved attachment for eyeglasses and spectacles, the object being to provide means for detachably securing supplemental lenses to eye-glasses and spectacles in front or behind the permanent lenses.

A further object is to provide means for tempering the light without changing the permanent lenses or frames,—and it consists of two supplemental lenses entirely separate from each other, provided with means for their attachment to eyeglasses or spectacles in front of or behind the permanent lenses, whereby the supplemental lenses are in a proper relative position with respect to the permanent lenses of the eyeglasses or spectacles.

My invention further consists in certain novel features of construction and combinations of parts as will be hereinafter more fully described and pointed out in the claims.

In the accompanying drawings, Figure 1 is a view of my improvement, in perspective. Fig. 2 is a view of one of the supplemental lenses, showing its means of attachment. Fig. 3 is a sectional view of two lenses, showing the manner of attachment of the supplemental lens to the permanent lens. Figs. 4, 5 and 6 represent different forms of my improvement.

My invention is equally applicable to spectacles as eyeglasses, but for the sake of convenience, I have shown the improvement in the drawings as applied to eyeglasses and will now so describe same.

A represents the frame-work of an ordinary pair of eyeglasses and B the lenses thereof. The frame-work A is made up principally of the eyes or bows $a$, spring $b$ and nose-piece $c$, said parts being arranged and connected as shown in the drawings.

The supplemental lenses C are provided with forwardly projecting hooks or clamps $d$, preferably of spring metal, which are preferably located as shown in Fig. 2 of the drawings, and are adapted to fit over the eyes or bows $a$, as shown at $e$, $e$, in Fig. 1.

When the supplemental lens or lenses C are in the position above described, it will be observed that the elasticity of the spring hooks or clamps $d$, will hold the supplemental lenses C firmly against displacement. Hence a perfect relationship of lenses B and C is at all times maintained, which is not the case where two independent pairs of glasses are used.

In Fig. 4, lens C is preferably provided with a metal eye or bow $g$, which latter is provided with three spring clamps $h$, by means of which the supplemental lens C is firmly secured in place on lens B, when desired. The spring clamps $h$ are preferably located as shown in the drawings, and by so doing, all liability of movement in any direction is obviated. Hence a perfect alignment with lenses B is assured.

In Fig. 5, I have shown lens C provided with a metal frame D, which latter is provided with forwardly projecting pins $e'$, preferably curved inward, said pins being adapted to hook over the eye or box or over the outer edge of the permanent lens, as the case may be, and when in such position is firmly held on said permanent lens by means of the spring clamp $f$, which latter can be of any well known form, but for durability and neatness is preferably of the form shown in the drawings.

In Fig. 6, the supplemental lenses are each preferably provided with a spring clamp $h'$ and bow spring $i$, each of which is preferably located as shown in the drawings. The bow springs $i$ project at right angles from lenses C or their connected parts and are adapted to spring around the connecting posts $j$ (shown in Fig. 1). The spring clamps $h'$ are adapted to engage the outer edges of the lenses B or their eyes or bows as the case may be.

In order to prevent the lenses from being scratched or otherwise injured, the spring clamps or equivalent securing devices may be provided with a suitable facing material or rubber tips as shown in Fig. 4.

Colored lenses provided with my improved attachments can be attached to and detached from a pair of glasses or spectacles of any description without any exertion whatever and when in their attached position do not mar the appearance of the glasses.

It is evident that changes in the construction and relative arrangement of the several parts might be made without avoiding my invention and hence I would have it understood that I do not restrict myself to the particular construction and arrangement of parts shown and described; but, Having fully described my invention, what I claim as new, and desire to secure by Letters Patent, is—

1. An attachment for eyeglasses or spectacles consisting of supplemental lenses entirely separate from each other, and hooks located at the edges thereof adapted to engage some portion of the glasses or spectacles at the edges of the rims of the latter, substantially as set forth.

2. An attachment for eyeglasses and spectacles, consisting of supplemental lenses entirely separate from each other and spring hooks located at the edge of the latter and adapted to receive and hook over the edge of the spectacles or eyeglasses, substantially as set forth.

In testimony whereof I have signed this specification in the presence of two subscribing witnesses.

HENRY FRANC, JR.

Witnesses:
SIDNEY E. ROSENTHAL,
CHAS. McGUIGGAN.